A. WILLIAMS.
Vegetable Cutter.
No. 1,101.
Patented March 12, 1839.
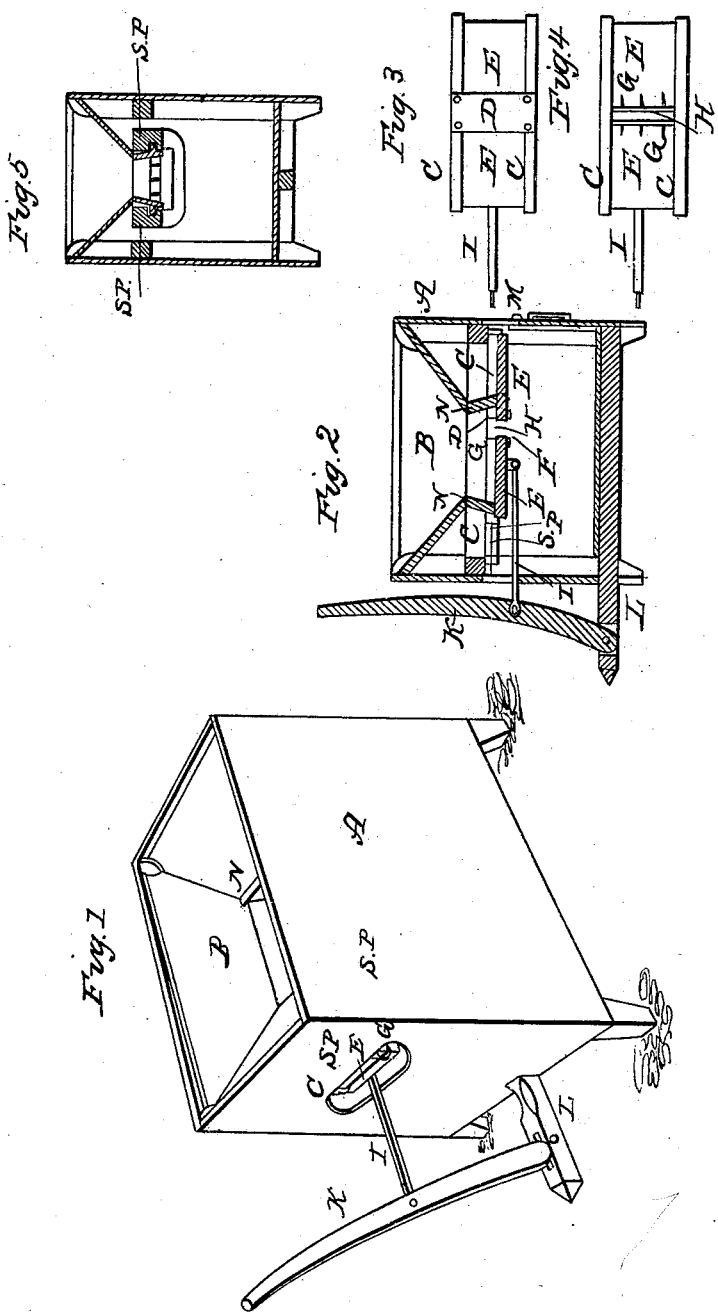

UNITED STATES PATENT OFFICE.

ABEL WILLIAMS, OF ASHFIELD, MASSACHUSETTS.

MACHINE FOR CUTTING POTATOES AND OTHER VEGETABLES.

Specification of Letters Patent No. 1,101, dated March 12, 1839.

*To all whom it may concern:*

Be it known that I, ABEL WILLIAMS, of Ashfield, in the county of Franklin and State of Massachusetts, have invented a new and useful Machine for Cutting Potatoes and other Vegetables, called a "Vegetable-Cutter;" and I do hereby declare that the following is a full and exact description, reference being had to the accompanying drawings, making a part of this specification, in which—

Figure 1 is a perspective view. Fig. 2 a vertical and longitudinal section. Fig. 3 a top view of the gate, and Fig. 4 a view of the same with the upper double edge knife removed, and Fig. 5 a cross section.

First construct a box A, of about three feet high, and about two long, and about twenty inches wide inclosing a frame with a hopper, B, in the upper side, about a foot deep. Upon the under side of the hopper, at the mouth of it, place two string-pieces S, P, lengthwise, the ends of which rest upon the frame inclosed in the box. The distance between these string-pieces, should be the width of the mouth of the hopper, and they have grooves cut in them, in the lower part, for the gate, containing the knives, to play in, and which is hereafter to be described.

Secondly, the gate is constructed in the following manner: Take two pieces of scantling C, C, of nearly the length of the string-pieces with a tongue of sufficient size to fill the grooves in the string-pieces aforesaid. Across the center of these scantlings, is placed the knife D or the upper side, of about five or six inches wide, and extends to the outsides of the scantlings, and is pinned or screwed upon them, having an edge on both sides to cut the vegetables. The space between these scantlings is to be covered, on the under side, with two pieces of boards E E, except about three inches in the center under the knife, which leaves a space F for the vegetable to fall through after being cut. These boards close up the mouth of the hopper to prevent the vegetables from falling through before being cut. Near the edges of these boards, next to the open space aforesaid, there are to be three or more perpendicular knives G on each side of the main knife, extending from the under surface of the knife D to the boards E E, with shanks passing through the boards and fastened on the under sides by nuts. These perpendicular knives have their faces and edges at right angles to the face and edge of the main knife. The main knife resting on the scantlings as aforesaid, is directly over the space, between the boards on the under side. There is also to be a bevel H in the center of the space between the boards aforesaid, the ends resting in the scantlings, for the purpose of turning the vegetable down, after being cut. The scantlings, boards and knives, when put together, as aforesaid, we call the gate, and it is designed to be moved backward and forward, horizontally, in the grooves aforesaid, in the manner of a gate in a saw mill. The gate aforesaid is operated by means of a connecting rod I, attached to one of the boards on the gate, with joints, and extending out through the end of the box, and attached to a lever K, the lower end of which is fastened by a pin into a mortise in a piece of timber L, extending out from the frame in the box. There is to be a door M in one end of the box, in the end opposite to the lever. There are also to be two pieces of plank or boards N at the mouth of the hopper extending down diagonally to the boards on the gate, so as nearly, to touch the boards, and for the knives to cut against, and prevent the vegetable from escaping the knives. One of these boards should be made movable, that the gate may be withdrawn from the machine. The machine is operated by hand power.

I do not claim to be the inventor of the mode of cutting vegetables by means of a single edged knife, attached to a gate and cutting against a bed, with small knives having their planes and edges at right angles to the plane and edge of the main knife, such having been invented before mine, but What I do claim as my invention, and desire to secure by Letters Patent is—

The combination of two sets of small knives as herein described, with a double edged knife attached to a gate; the whole being constructed and operating substantially as herein described.

ABEL WILLIAMS.

Witnesses:
WM. ELLIOT, Jr.,
ALMON BRAINARD.